(12) United States Patent
Lee

(10) Patent No.: US 7,760,389 B2
(45) Date of Patent: Jul. 20, 2010

(54) IMAGE FORMING DEVICE HAVING RESOLUTION COMPENSATION FUNCTION AND METHOD THEREOF

(75) Inventor: Bong-gi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1494 days.

(21) Appl. No.: 11/102,758

(22) Filed: Apr. 11, 2005

(65) Prior Publication Data

US 2005/0237356 A1    Oct. 27, 2005

(30) Foreign Application Priority Data

Apr. 27, 2004    (KR) .................... 10-2004-0029243

(51) Int. Cl.
| G06F 15/00 | (2006.01) |
| G06K 1/00 | (2006.01) |
| G06K 15/00 | (2006.01) |

(52) U.S. Cl. ........................ 358/1.2; 358/3.1
(58) Field of Classification Search ............ 358/1.2, 358/1.15, 540, 1.9, 1.18, 2.1, 3.02, 3.03, 358/3.06, 3.09, 3.1, 3.12

See application file for complete search history.

(56) References Cited

U.S. PATENT DOCUMENTS

2004/0227962 A1* 11/2004 Xia .......................... 358/1.2

FOREIGN PATENT DOCUMENTS

| JP | 05-236255 | 9/1993 |
| JP | 07-148990 | 6/1995 |
| JP | 2001-219602 | 8/2001 |
| JP | 2001-341390 | 12/2001 |
| JP | 2003-150339 | 5/2003 |
| KR | 1996-0040667 | 12/1996 |

\* cited by examiner

*Primary Examiner*—Douglas Q Tran
(74) *Attorney, Agent, or Firm*—Roylance, Abrams, Berdo & Goodman, L.L.P.

(57) ABSTRACT

An image forming device having a resolution compensation function comprises a storage for storing scaling information and resolution information with respect to printing data, a controller for setting a resolution of scaled printing data to a specific resolution based on the scaling information, and a print engine for forming an image of the received printing data according to the resolution set by the controller. The image forming device (such as a printer, a facsimile machine, or a copier) minimizes the degradation of the image quality when scaling an image to be printed or copied. Furthermore, the degradation of the scaled image quality is reduced when the image forming device is directly connected to a USB compatible storage medium or an image capturing device such as a digital camera, or a digital camcorder, and the image forming device receives and prints an image from the connected storage medium or the image capturing device. The present invention is especially suitable for a printer (which is an image forming device), and can be used with a photo printer which is used to print photographs or images. Alternatively, it can be connected to a network so that a plurality of host computers can share the image forming device.

10 Claims, 7 Drawing Sheets

IMAGE FORMING DEVICE HAVING RESOLUTION COMPENSATION FUNCTION AND METHOD THEREOF

CROSS-REFERENCE TO RELATED APPLICATIONS

This application claims the benefit under 35 U.S.C. §119(a) of Korean Patent Application Serial No. 2004-29243, filed on Apr. 27, 2004, in the Korean Intellectual Property Office, the entire disclosure of which is hereby incorporated by reference.

BACKGROUND OF THE INVENTION

1. Field of the Invention

The present invention generally relates to an image forming device having a resolution compensation function and a method for using the same. More particularly, the present invention relates to an image forming device and a resolution compensation method that adjusts the print quality of scaled printing data by adjusting the resolution of the scaled printing data when scaling the printing data.

2. Description of the Related Art

An image forming device such as a printer or a copier generally prints an original document at real size or prints printing data transmitted from a host computer. A user may want to scale the image size, however, to save paper or to view multiple pages on a single sheet. For example, printing data can be scaled and reduced to print multiple pages on a sheet. This 'multiple pages on a sheet' function causes a decrease in the resolution of each page on the printed sheet and a deterioration of the print quality. Likewise, if a copier scales and reduces an original image size, the print quality of the printed image is likely to deteriorate as compared with the original image.

FIG. 1 illustrates a conventional printing method. First, a user creates a document to be printed using a document processing program (APP) 10. The document is transmitted to a graphic device interface (GDI) 20. The GDI 20 is an interface such as those provided by MICROSOFT WINDOWS® operating systems such as WINDOWS® and WINDOWS XP®, and is installed in a host computer together with the operating system. The GDI 20 obtains font, bitmap, and vector information relating to the characters and graphics in the document to be printed and translates the information into function calls recognizable by a driver program 30. Typically, the function calls are referred to as device driver interface (DDI) function calls. When the user gives a print command, the GDI 20 reads resolution information from the driver program 30. The GDI scales the document according to the resolution information and sends the scaled document to the driver program 30.

The driver program 30 receives the function calls from the GDI 20 and converts the calls into printing data recognizable by an image forming device such as a printer 50. The driver program 30 contains resolution information for the document to be printed by the printer 50. Typically, the resolution information is expressed as a number of dots per inch, or dpi. The printing data generated by the driver program 30 is sent to the printer 50 through a spooler 40, and the printer 50 prints the printing data on paper.

The driver program 30 includes a DDI interface 31, a user interface (UI) 32, and a printing data generator 33. The DDI interface 31 translates the function calls received from the GDI 20. The printing data generator 33 converts the function calls into printing data, such as printer control language (PCL) or page description language (PDL), suitable for the printer 50. The printing data is sent to the spooler 40.

The user interface 32 provides the user with an interface for setting the driver program 30 options. Examples of options include print quality, print resolution, and the number of pages per sheet. If the user uses the WINDOWS® operating system, the user can set the print options through a control panel provided by the WINDOWS® operating system. After the user sets the print options, the print options are applied to the print jobs. The WINDOWS® operating system is widely used and is therefore not described in detail for conciseness.

FIG. 2 illustrates the deterioration in detail that occurs in a conventional print method when four pages are printed on a single sheet of paper. If the resolution set in the driver program 30 is 600 dpi, the effective resolution of the printed document A2 is 300 dpi. This is because the 600 dpi image must be printed in one half of the original space, and, thus, one half of the image information is discarded according to the conventional method. As the number of pages per sheet increases, the space available for each page decreases. Accordingly, the effective resolution of the print document A2 is reduced and the print quality of the print document A2 deteriorates.

FIG. 3 illustrates the degradation that occurs when a copier reduces and prints a document at one third of its original size. Referring to FIG. 3, when copying and reducing a document A3 with a preset print resolution of 600 dpi, the printed document A4 is printed in one third of the same space. The image therefore has the same effective resolution as a 200 dpi printout. That is, the reduction of the document A3 causes the degradation of detail in the printed document A4. A facsimile machine, or a multifunction machine which selectively combines the functions of a facsimile machine, a printer, and the like, has similar limitations in scaling an original document.

Accordingly, there is a need for an image forming device with a resolution compensation function that prevents image deterioration when scaling an image.

SUMMARY OF THE INVENTION

An aspect of the present invention is to solve at least the above problems and/or disadvantages and to provide at least the advantages described below. Accordingly, an aspect of the present invention is to provide an image forming device having a resolution compensation function and a resolution compensation method that minimizes degradation of print quality when scaling an image to be printed or copied by the image forming device.

To achieve the above aspects of the present invention, an image forming device having a resolution compensation function comprises a storage for storing scaling information and resolution information with respect to printing data, a controller that sets the resolution of scaled printing data to a specific resolution based on the scaling information when printing data is received, and a print engine for forming an image of the received printing data according to the resolution set at the controller.

According to another aspect of the present invention, the specific resolution increases or decreases in proportion to a scaling value.

In accordance with a further aspect of the present invention, the specific resolution is the same resolution as resolution information previously stored in the storage.

According to yet another aspect of the present invention, the image forming device further comprises an operational panel for changing the scaling information and the resolution information stored in the storage.

In accordance with one more aspect of the present invention, the image forming device is one of a facsimile machine, a printer, a copier, or a multifunction machine that selectively combines the functions of a facsimile machine, a printer, and a copier.

In yet another aspect of the invention, the image forming device further comprises an interface for interfacing with an external storage medium.

In one more aspect of the invention, the printing data is received from the external storage medium and an information processing device.

In accordance with a further aspect of the present invention, the external storage medium is universal serial bus (USB) compliant.

In yet another, further aspect of the invention, the external storage medium can be connected to an image capturing device.

In accordance with one more aspect of the invention, the image forming device further comprises a network interface which is connected to a host computer through a network and which is capable of receiving printing data from the host computer through the network.

According to another aspect of the present invention, a resolution compensation method comprises the steps of referring to scaling information relating to a document to be printed in an application, increasing or decreasing a preset resolution based on the scaling information in proportion to the increase or decrease of a scaling value, and transmitting printing data according to the increased or decreased resolution to the image forming device.

In another aspect of the invention, the application is provided to at least one host.

In accordance with another aspect of the invention, the at least one host is connected with the image forming device through a network.

In yet another aspect of the invention, the resolution is the same as the preset resolution when the preset resolution is a maximum resolution of the image forming device.

In a further aspect of the invention, the document to be printed is received from an external storage medium.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
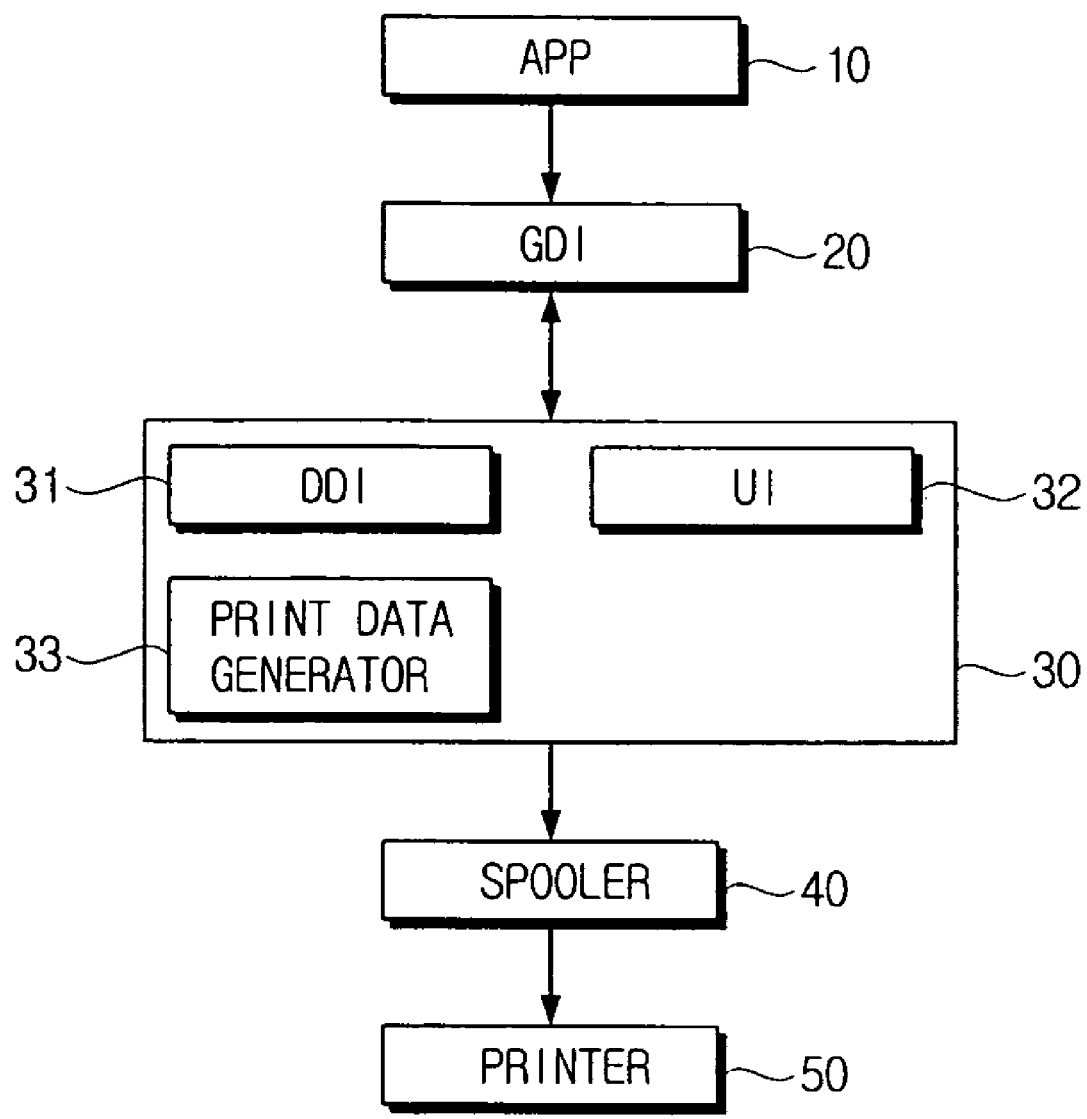
FIG. 1 illustrates a conventional printing system.
Figure 2:
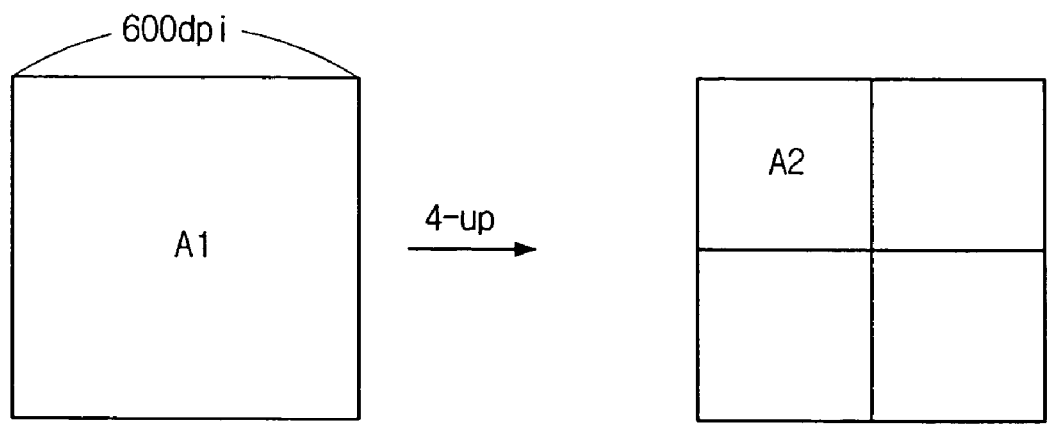
FIG. 2 illustrates the resolution degradation that occurs in a conventional printing process.
Figure 3:
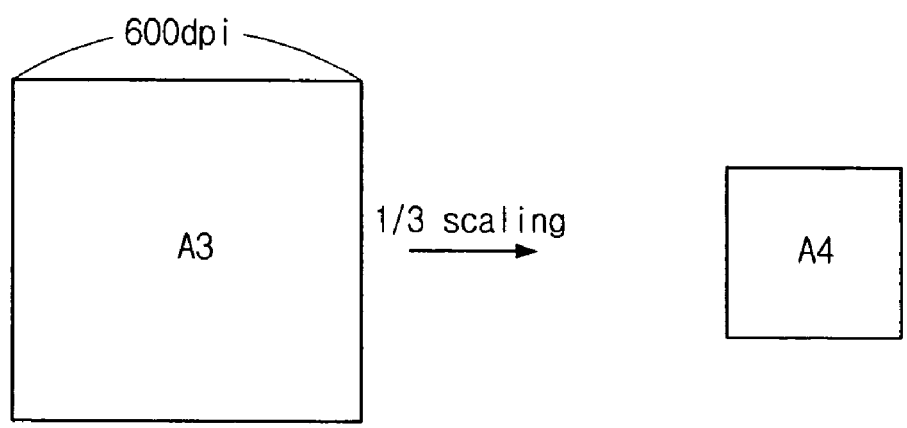
FIG. 3 illustrates the resolution degradation that occurs when a conventional copier reduces and copies a document at 600 dpi.
Figure 4A:
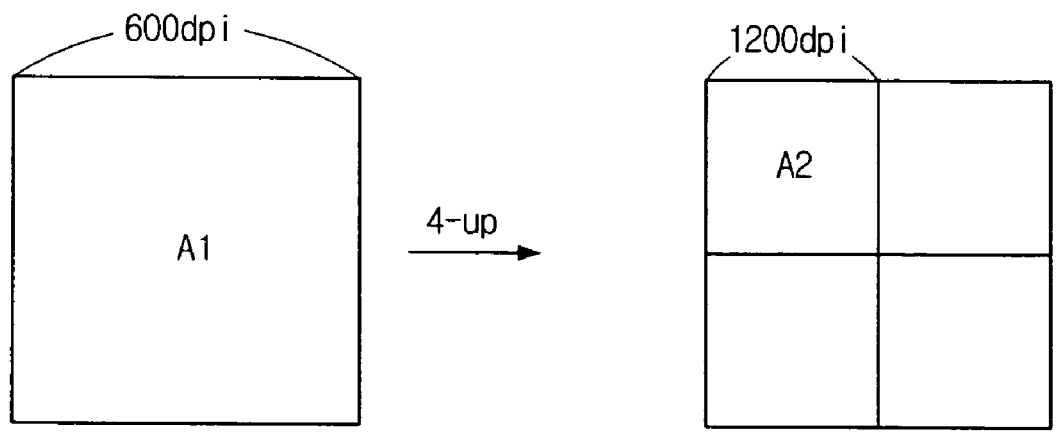
FIGS. 4A and 4B illustrate a resolution compensation method according to an embodiment of the present invention.
Figure 4B:
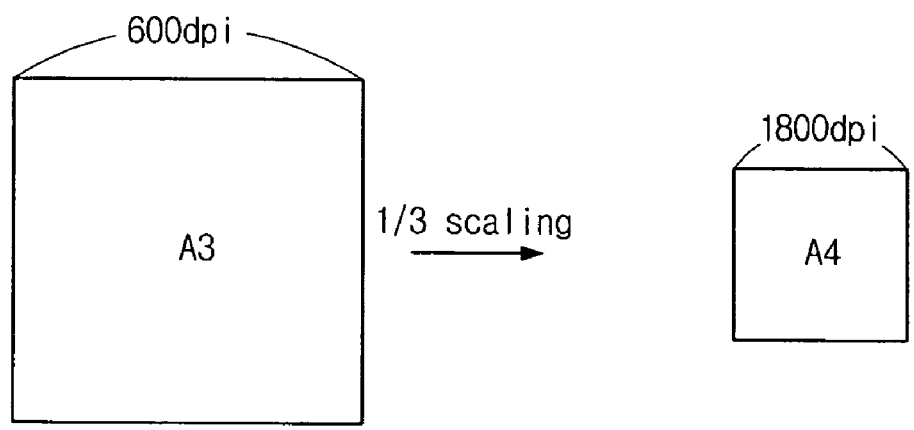

FIGS. 4A and 4B illustrate a resolution compensation method according to an embodiment of the present invention. Referring to FIG. 4A, a print resolution is preset to 600 dpi with respect to a document A1. When printing four documents A1 on a single piece of paper (such as an A4-sized paper), the rendering resolution is increased to compensate for the print resolution 600 dpi of the scaled-down document A2. In other words, the rendering resolution is increased to 1200 dpi so that none of the information in the 600 dpi image is lost during the resizing and printing process. The increase of the rendering resolution can be performed by a driver program installed in a host computer (not shown), or at the printer.

FIG. 4B illustrates the resolution compensation method in a copier. If a document A3 to be copied is scaled-down to ⅓ of its original size, the resolution of the document A3 is applied to the scaled document A4 to prevent degradation of the image. In other words, if the original resolution of document A3 is 600 dpi, the resolution of the printed image is 1800 dpi. In this manner, none of the image information is lost during the printing process. Preferably, the print resolution (600 dpi) of the document A3 is the average resolution of the copier. If the resolution of the document A3 is set at its maximum, the resolution of the scaled document A4 is also set at its maximum.

Figure 5:
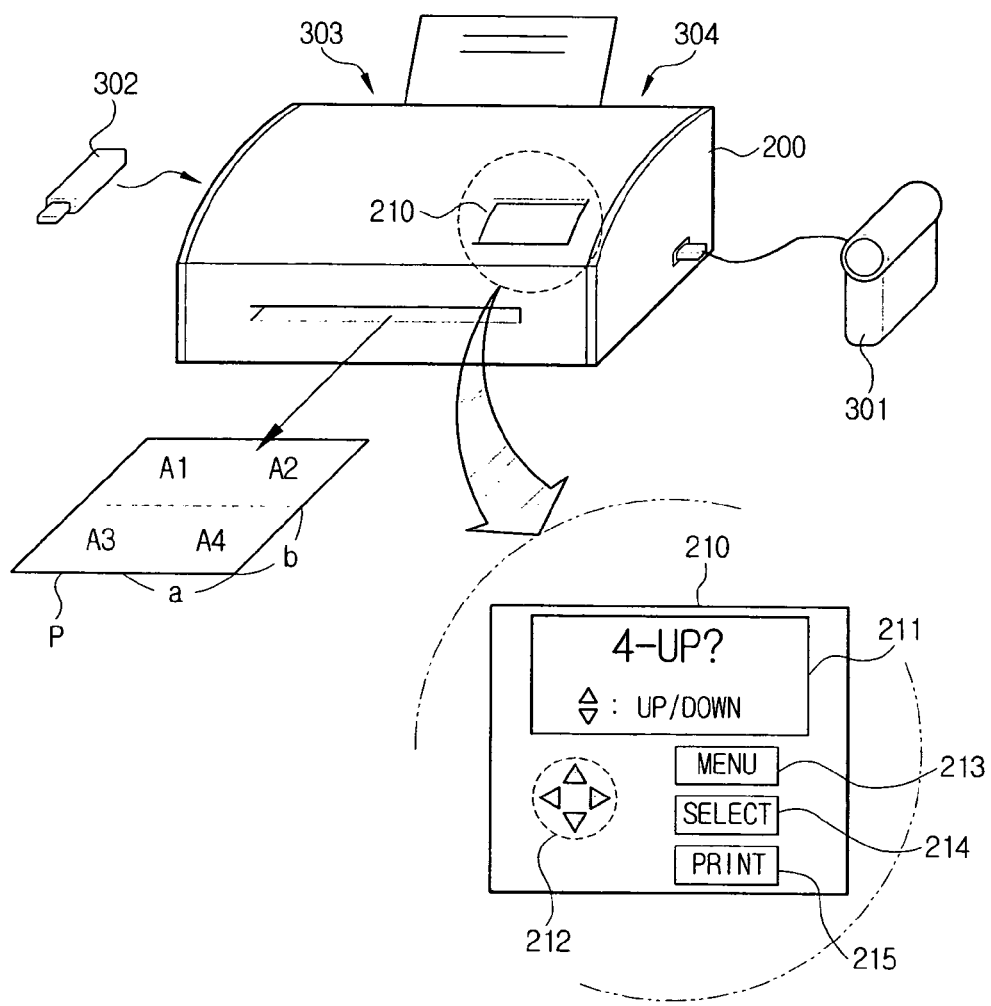
FIG. 5 illustrates a printer having a resolution compensation function according to an embodiment of the present invention.

FIG. 5 illustrates a printer, which is one example of an image forming device, that has a resolution compensation function according to an embodiment of the present invention. The printer 200 can download and print an image file from a storage medium 302, a digital camera 301, and the like (which are preferably USB compliant). The printer 200 prints printing data, which is received through the connection to a network 303 such as a LAN, or from a host computer 304, onto a printing paper P. A panel operating part 210 is provided on the main body of the printer 200 to allow a user to set print options of the printer 200. Preferably, the panel operating part 210 includes a liquid crystal display (LCD) 211 for displaying the status of the printer 200 or a menu to facilitate setting print options. When the user selects a menu key 213 provided at the panel operating part 210, the LCD 211 displays a menu for setting the number of pages per sheet. The user specifies the desired number of pages by, for example, pushing direction keys 212, a select key 214, and a print key 215 in that order. The number of pages set by the user is scaled down and printed on a paper P. In FIG. 5, an original document is reduced in size by half so that four pages A1 through A4 can be printed on a single sheet of paper P. Preferably, the resolution of each of the pages A1 through A4 is the same as that of the original document before the scaling. For example, a user may preset the printer resolution to 600 dpi with respect to the paper P, and set the print option to print out four pages on the paper P. In this situation, it is preferred that the resolution of the each of the pages A1 through A4 printed on the paper P is the same as the resolution of the un-scaled document. Accordingly, the printer 200 needs to render the printing data (which is received from one of the storage medium 302, the digital camera 301, or the host computer 304) at 1200 dpi. When the printing data rendered with the resolution at 1200 dpi is scaled and printed onto the paper P, the respective pages A1 through A4 maintain the same detail as an un-scaled, 600 dpi printout.

In addition to receiving printing data from the host computer 304 or over the network 303, the printer 200 may receive an image file from the storage medium 302 or an image capturing device such as the digital camera 301 (that has a storage medium) or a digital camcorder (not shown). In this case, the printer 200 may include a program with an auto printing function for printing image files. For example, the printer firmware may include a program for scanning a Joint Photographic Expert Group (JPEG) image file, a Tagged Image File Format (TIFF) image file, or the like, from the storage medium 302 or the image capturing device 301, and converting the scanned file to bitmap data. If the printer 200 has a hard disk drive, the program for scanning and converting an image file to bitmap data may be installed on the hard disk drive. If the printer 200 is an inkjet type printer, a program may be installed to convert the bitmap data into electric signals to spray ink drops from an ink head.

Figure 6:
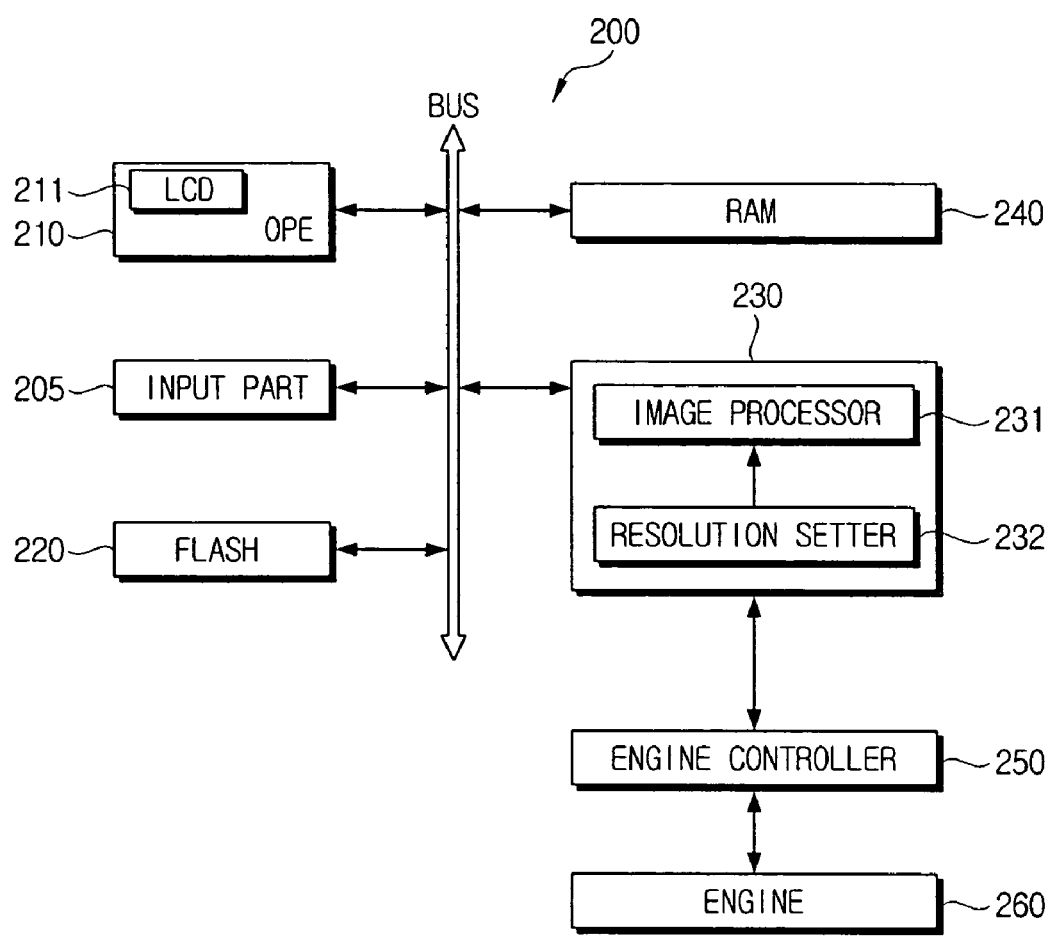
FIG. 6 is a block diagram of the printer of FIG. 5.

FIG. 6 is a block diagram of the printer 200 shown in FIG. 5. The printer 200 includes an input part 205, a panel operating part 210, a flash read only memory (ROM) 220, a random access memory (RAM) 240, a controller 230, an engine controller 250, and an engine 260.

The input part 205 interfaces the printer 200 to an external device. The input part 205 has an IEEE 1284 standard-compliant parallel cable port, or an RJ-45 jack to connect with a LAN (local area network) cable. Preferably, the input part 205 also includes a USB jack and hardware logic capable of interfacing to the various specifications. To interface with a USB device, the input part 205 includes a USB controller. If the input part 205 receives printing data directly from a plurality of host computers through a network (which is not illustrated), the input part 205 preferably includes a network interface card (NIC) to receive printing data from the host computers. If the printer 200 has a NIC, the respective host computers preferably search and register the Internet Protocol (IP) address of the printer 200.

The panel operating part 210 displays the status of the printer 200 when the user sets print options with respect to the printer 200 or when the user wants to know information relating to the status of the printer 200. The LCD 211, which is part of the panel operating part 210, displays print options when the user pushes the menu key 213. The LCD 211 can display printing resolution, printing density, a scaling value, and the type of printing medium. The LCD 211 can further display the network configuration of the printer 200 and a water mark (which are known in the art and thus not explained in further detail for conciseness). When the user pushes the menu key 213, a menu for setting the number of pages per sheet is displayed on the LCD 211 and the user selects the desired number of pages by pushing the direction keys 212. Once the desired number of pages is selected, the user pushes the select key 214 of the printer 200 to confirm the selection. The user then pushes the print key 215 to print a document according to the set number of pages per sheet.

The flash ROM 220 includes a control program to control the printer 200. The flash ROM 220 also stores the values of the print options set by the user through the panel operating part 210. For example, the flash ROM 220 stores values relating to resolution, printing density, and the scaling ratio set by the user for the printer 200.

The controller 230 controls the overall operation of the printer 200, and converts the printing data received through the input part 205 to bitmap data. The controller 230 resets the rendering resolution of the printing data using the resolution information and the scaling value information stored in the flash ROM 220 and renders the printing data. For example, assume that the maximum resolution of the printer 200 is 1200 dpi, the resolution information stored in the flash ROM 220 is 600 dpi, and the scaling value information is '½'. The rendering resolution is reset to the same resolution as the printer resolution at 600 dpi before the scaling the image. In other words, the rendering resolution is set to 1200 dpi so that none of the details of the 600 dpi image are lost when it is scaled by ½. The rendering resolution relates to the bitmap data supplied from the controller 230 to the engine controller 250, rather than the preset printer resolution (600 dpi) of the printer 200. The rendering resolution does not exceed the maximum resolution of the printer 200.

Preferably, the controller 230 includes an image processor 231 and a resolution setter 232. The image processor converts the printing data received from the input part 205 to bitmap data. The resolution setter 232 calculates the rendering resolution with respect to the printing data to be printed based on the print options stored in the flash ROM 220 relating to, for example, the number of pages per sheet P and the scaling option. The resolution setter 232 can set the rendering resolution by executing an application program stored in the flash ROM 220, or can be implemented as hardware in the controller 230. If the resolution setter 232 is implemented as separate hardware, the resolution setter 232 may include a divider that divides the stored resolution information by the scaling information. The divider can be realized using a shift register. The use of a shift register as a divider will be appreciated by one skilled in art, and, thus, is not explained for brevity.

The engine controller 250 receives bitmap data from the controller 230, converts the bitmap data to a control signal according to the characteristics of the printer 200, and provides the control signal to the engine 260. For example, an inkjet printer 200 may generate and apply electric pulses to a plurality of nozzles at an ink head, and a laser printer 200 may use the control signal to control the optical power of a laser diode which scans a laser beam onto an organic photoconductor (OPC). As used herein, control signals also refers to control signals related to the driving motors in a laser printer and the actuator in an inkjet printer. That is, the engine 260 may include mechanical components such as motors and actuators.

Figure 7:
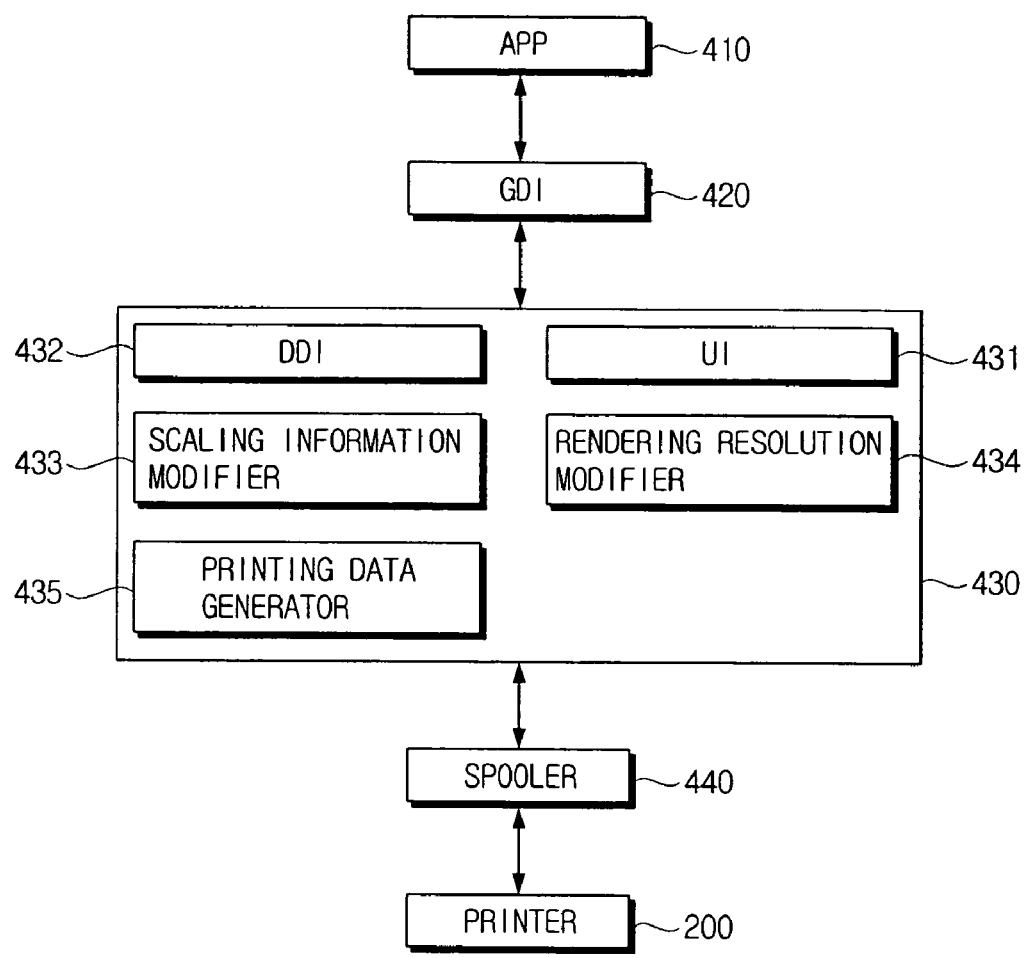
FIG. 7 is a block diagram of a host computer applying the resolution compensation method according to an embodiment of the present invention.

FIG. 7 is a block diagram of a host computer that uses the resolution compensation method according to an embodiment of the present invention. Referring to FIG. 7, a document processing program (APP) 410, a graphics device interface (GDI) 420, a driver program 430, and a spooler 440 are application programs or operating system programs installed in a host computer. The document processing program (APP) 410 can be a program such as MICROSOFT® Word, Hangul by Haansoft Inc., or STAROFFICE® by Sun Microsystems, Inc. The document processing program (APP) 410 is not limited to these examples, of course, and may be any suitable program for document editing and creation. When the user executes a command to print a document prepared in the document processing program (APP) 410, the GDI 420 generates data for the DDI that has a suitable size in reference to the resolution information set at the driver program 430 and provides the data to the driver program 430. The GDI 420 obtains font, bitmap, and vector information relating to the text and graphics forming the document to be printed, and converts the information to data recognizable by the driver program 430.

The driver program 430 receives and converts the data from the GDI 420 to printing data recognizable by the image forming device, that is, by the printer 200. The driver program 430 keeps resolution information with respect to a document to be printed at the printer 200. The resolution information is represented as the number of printable dots per inch. The printing data prepared at the driver program 430 is transmitted to the printer 200 via the spooler 440, and the printer prints the received printing data onto paper. The driver program 430 re-adjusts the rendering resolution relative to the print options set through a user interface (UI) 431. For example, the rendering resolution is adjusted for the number of pages per sheet P, or for the scaling value.

Preferably, the driver program 430 includes the UI 431, a DDI 432, a scaling information modifier 433, a rendering resolution modifier 434, and a printing data generator 435.

The UI 431 provides the user with an interface menu enabling the user to set options with respect to the driver program 430 such as print quality, printing resolution, and the number of pages per sheet. If the user utilizes the WINDOWS® operating system, the user can set the print options of the printer 200 using a control panel provided by the operating system. Alternatively, the user may set the desired print options through an on-screen menu with respect to a document that the user intends to print. The operation of the WINDOWS® operating system will be understood to those skilled in the art and a further description is omitted for clarity and conciseness.

The DDI 432 interprets the data received from the GDI 420. The interpreted data is converted to printing data, such as printer control language (PCL) or page description language (PDL), suitable for the printer 200, at the printing data generator 435, and transmitted to the spooler 440. The scaling information modifier 433 stores scaling information, and updates the scaling information based on scaling information set by the user through the UI 431. The rendering resolution modifier 434 resets the resolution of printing data to be generated at the printing data generator 435 based on the scaling information set at the scaling information modifier 433. If the scaling information stored in the scaling information modifier 433 is set to ½ with respect to the document, the rendering resolution modifier 434 sets the rendering resolution so that the details of the scaled printing data are not decreased in view of the scaling information. For example, if the resolution is set to 600 dpi at the driver program 430, and the scaling value is ½, the rendering resolution of the ½ scaled printing data is set to 1200 dpi to maintain the same detail as the pre-scaled printing data. The printing data generator 435 generates printing data according to the 1200 dpi rendering resolution calculated by the rendering resolution modifier 434, and supplies the printing data to the spooler 440. The spooler 440 buffers the printing data received from the printing data generator 435 and sends the buffered printing data to the printer 200.

Figure 8:
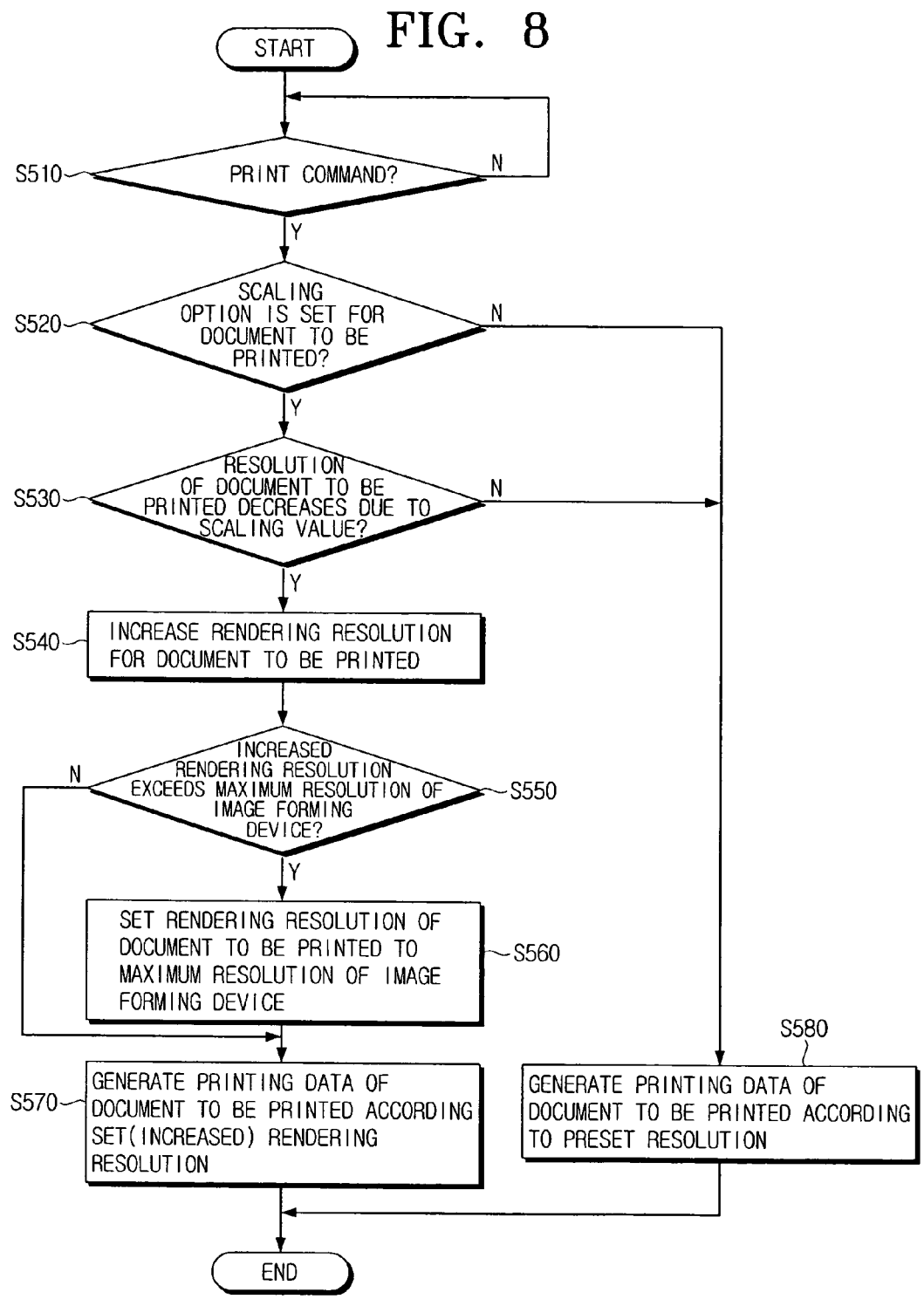
FIG. 8 is a flowchart of the resolution compensation method of the image forming device according to an embodiment of the present invention.

FIG. 8 is a flowchart of a resolution compensating method for an image forming device according to an embodiment of the present invention. When a user prints a document in a document processing program (S510), the GDI 420 of an operating system acquires resolution information of the printer 200 from the driver program 430 in response to the print command, generates DDI function calls based on the acquired information, and provides the DDI function calls to the driver program 430.

The driver program 430 determines whether a scaling option is set with respect to the document to be printed based on the information at the scaling information modifier 433 (S520). The scaling option indicates that the document to be printed is reduced or that multiple pages A1 to A4 are printed onto a paper P with each of the pages A1 to A4 scaled down. If a scaling option is not set for the document to be printed, the DDI 432 sends the result of the received DDI function calls to the printing data generator 435. The printing data generator 435 converts the received DDI function calls to printing data (S580) and sends the printing data to the spooler 440. The spooler 440 buffers and provides the printing data to the printer 200. On the other hand, if a scaling option is set at the scaling information modifier 433, the rendering resolution modifier 434 determines whether the resolution of the document to be printed is degraded due to the scaling option set at the scaling information modifier 433 (S530). If so, the rendering resolution modifier 434 increases the rendering resolution of the document to be printed (S540). It is preferred that the rendering resolution for the document to be printed is the same as the resolution preset at the scaling information modifier 433. The rendering resolution modifier 434 determines whether the increased resolution for the document to be printed exceeds the maximum resolution of the printer 200 (S550). For example, consider the case where the maximum resolution of the printer 200 is 1200 dpi, the resolution set for the document to be printed at the driver program 430 is 600 dpi, and the number of pages per sheet P is set to 6 (2 pages horizontally and 3 pages vertically) at the scaling information modifier 433. In this case, each of the 6 600 dpi pages has to be printed at 1800 dpi to maintain its original detail. However, this exceeds the maximum resolution of the printer 200. To address this, the rendering resolution modifier 434 sets the resolution to 1200 dpi, providing an effective resolution of 400 dpi for each of the three pages. Specifically, when the increased resolution exceeds the maximum resolution of the printer 200, the rendering resolution for the document to be printed is set to the maximum resolution of the printer 200. Next, the printing data generator 435 generates printing data based on the reset rendering resolution and transmits the printing data to the printer 200. As a result, even when a document to be printed or copied is scaled, the detail of the printed document is not severely degraded.

An image forming device, such as a printer, a facsimile machine, or a copier, according to an embodiment of the present invention, minimizes the degradation of the image quality when scaling an image to be printed or copied. Furthermore, the degradation of the scaled image quality is reduced when the image forming device is directly connected to a storage medium or an image capturing device such as a digital camera, or a digital camcorder, and the image forming device receives and prints an image from the connected storage medium or the image capturing device. The present invention is especially useful in a printer which is used to print photographs or images, and which can be connected to a network so that a plurality of host computers can share the image forming device.

While the invention has been shown and described with reference to certain embodiments thereof, it will be understood by those skilled in the art that various changes in form and details may be made therein without departing from the spirit and scope of the invention as defined by the appended claims.

What is claimed is:

1. An image forming device having a resolution compensation function comprising:

a storage for storing scaling information and resolution information with respect to printing data;

a controller for setting a resolution of scaled printing data to a specific resolution based on the scaling information when printing data is received to maintain an initial resolution of the printing data in view of the scaling information; and a print engine for forming an image of the received printing data according to the resolution set at the controller.

2. The image forming device according to claim 1, wherein the specific resolution increases or decreases in proportion to a scaling value.

3. The image forming device according to claim 1, wherein the specific resolution is the same resolution as the resolution information stored in the storage.

4. The image forming device according to claim 1, further comprising a panel operating part for changing the scaling information and the resolution information stored in the storage.

5. The image forming device according to claim 1, wherein the image forming device is one of a facsimile machine, a printer, a copier, or a multifunction machine that selectively combines functions of a facsimile machine, a printer, and a copier.

6. The image forming device according to claim 1, further comprising an interface for interfacing with an external storage medium.

7. The image forming device according to claim 6, wherein the printing data is received from the external storage medium.

8. The image forming device according to claim 7, wherein the external storage medium is universal serial bus (USB) compliant.

9. The image forming device according to claim 8, wherein the external storage medium is connectable to an image capturing device.

10. The image forming device according to claim 1, further comprising a network interface connected to a host computer through a network and capable of receiving printing data from the host computer through the network.

* * * * *